United States Patent [19]

Mayrargue et al.

[11] Patent Number: 6,118,832
[45] Date of Patent: Sep. 12, 2000

[54] MULTIPLE-SENSOR EQUALIZATION IN A RADIO RECEIVER

[75] Inventors: Sylvie Mayrargue; François Pipon, both of Paris; Pierre Vila, Rueil-Malmaison, all of France

[73] Assignees: France Telecom; Thomson-CSF, both of Paris, France

[21] Appl. No.: 09/012,462

[22] Filed: Jan. 23, 1998

[30] Foreign Application Priority Data

Jan. 24, 1997 [FR] France ................................. 97 00787

[51] Int. Cl.$^7$ ................ H03D 1/04; H04B 1/10; H04L 1/06
[52] U.S. Cl. ................ 375/346; 375/229; 375/341; 375/347
[58] Field of Search ................ 375/346, 341, 375/347, 229

[56] References Cited

U.S. PATENT DOCUMENTS

| | | | |
|---|---|---|---|
| 5,752,168 | 5/1998 | Monot et al. | 455/67.3 |
| 5,812,090 | 9/1998 | Chevalier et al. | 342/378 |
| 5,828,658 | 10/1998 | Ottersten et al. | 370/310 |
| 5,848,105 | 12/1998 | Gardner et al. | 375/336 |
| 5,870,430 | 2/1999 | Pipon et al. | 375/229 |
| 5,889,825 | 3/1999 | Schreib | 375/347 |
| 5,973,638 | 10/1999 | Robbins et al. | 342/172 |

FOREIGN PATENT DOCUMENTS

| | | | |
|---|---|---|---|
| 0 669 729 A1 | 2/1995 | European Pat. Off. | H04B 7/005 |
| 0 669 729 A1 | 8/1995 | France . | |
| 8-046557A | 2/1996 | Japan | H04B 7/008 |

OTHER PUBLICATIONS

Vila P. et al, "MLSE Antenna Diversity Equalization of a Jammed Frequency–Selective Fading Channel" Signal Processing VII: Theories and Applications, Proceedings of EUSIPCO 94, vol. 3 Sep. 13–16, 1994, Edinburgh, UK.

Pierre Vila, et al., "MLSE Antenna Diversity Equalization of a Jammed Frequency–Selective Fading Channel," SIGNAL PROCESSING VII: Theories and Applications Proceedings of EUSIPCO 94, vol. 3, (Sep. 1994), pp. 1516–1519.

*Primary Examiner*—Stephen Chin
*Assistant Examiner*—Paul N. Rupert
*Attorney, Agent, or Firm*—Oblon, Spivak, McClelland, Maier & Neustadt, P.C.

[57] ABSTRACT

A method enabling a multiple sensor equalization in a radioelectrical receiver including a specified number of reception antennas, the method including the steps of estimating the transmission channel on each of the antennas; estimating the background noise component plus interference on each of the antennas on the basis of the estimation of the transmission channel; estimating the spatial correlation matrix referenced $\hat{R}_b$ of the background noise component plus interferences from the received signal; computing a spatial-temporal filter formed for each discrete temporal element of the estimated multiple-sensor channel of a spatial filter; achieving a temporal filtering of the data elements on the different sensors by the spatial-temporal filter; and equalizing the signal at output of the spatial-temporal filter by one-dimensional equalization at a symbol rate deciding the symbols transmitted.

6 Claims, 2 Drawing Sheets

MULTIPLE-SENSOR EQUALIZATION IN A RADIO RECEIVER

BACKGROUND OF THE INVENTION

The present invention relates to a method enabling multiple-antenna equalization in a radioelectrical receiver, enabling the reception of a digital radioelectrical signal of the series linear modulation type (or the like) on at least two antennas in the presence of several propagation paths, also called multiple paths, or in the presence of interfering sources also called jammers.

The invention also relates to a multiple-antenna radioelectrical receiver using such a method.

It can be applied especially to the implementation of HF transmission systems and of the base stations of GSM mobile radio communications systems.

In these systems, the transmitted signal comes from the phase and/or amplitude modulation of a carrier on a sequence of symbols of which a portion, known to the receiver, are called "learning sequences".

The channel may be that of transmissions in the high frequency (HF) range enabling long-distance communications (at distances of hundreds to thousands of kilometers). The multiple paths of the HF channel are due to the multiple reflections of the signal on the ionospheric layers of the atmosphere and on the ground. The channel may also be that of transmissions in the UHF or ultra-high frequency range used in mobile radio communications (for example GSM communications). The multiple paths of the mobile radio channel are due to multiple reflections on the surfaces of buildings and on terrestrial surface features.

As for jamming, it may be deliberate (wideband jamming for example) or involuntary (by other transmission signals using the same frequency band).

In many systems presently in operation, the matching with the characteristics of the transmission channel is made possible by the insertion, in the waveform, of learning sequences known to the receiver. There are then various possible ways to obtain the adaptive equalization of the useful signal received. Several approaches are described for example in the article by J. J. Proakis entitled "Adaptive equalization for TDMA digital mobile radio", IEEE Trans. on Vehicular Technology, Vol. 40, No. 2, May 1991. The processing referred to is a form of equalization based on the Viterbi algorithm associated with an estimation of the transmission channel by means of learning sequences. This approach is commonly used in GSM systems.

In the context of HF transmissions at high bit rates (2400 bauds), less complex approaches are preferred. These less complex approaches are provided by a simplified version of the Viterbi algorithm, the M-algorithm described in particular in an article by A. Baier and G. Heinrich entitled "Performance Of M-algorithm MLSE Equalizers In Frequency-Selective Fading Mobile Radio Channels", Proc. of 1989 International Conference on Communications, ICC'89, or again by a decision feedback equalizer or FE. This may be obtained by means of self-adaptive filters adapted by a recursive least-error squares type algorithm in preference to a gradient algorithm for reasons of speed of convergence, or it may be computed from an estimation of the transmission channel as in the article by P. K. Shukla and L. F. Turner, "Channel-Estimation-Based Adaptive DFE For Fading Multipath Radio Channels", IEEE Proceedings-I, Vol. 138, No. 6, December 1991.

When there is "fading", the variation of the power of the signals received leads to a deterioration of the performance characteristics in terms of the binary error rate (BET). The use of several antennas in equalizers with a diversity of antennas enables compensation for deterioration by taking advantage of the difference between the transmission channels corresponding to the different antennas.

In the presence of jamming, these equalization techniques become soon inefficient and specific anti-jamming techniques are necessary. These are, for example, error correction encoding, the excision of jamming by notch filtering, or the use of frequency hopping links. These techniques are used in many operational systems but are nevertheless limited when the interference phenomena are strong and occupy the entire band of the useful signal. It thus becomes appropriate to use anti-jamming means of greater efficiency, based on the use of antenna filtering techniques.

Antenna filtering techniques appeared in the early '60s. A summary description of these techniques is given in the doctoral thesis by P. Chevalier, "Antenne adaptative: d'une structure linéaire à une structure non linéaire de Volterra" ("Adaptive antennas: from a linear structure to a non-linear Volterra structure"), Université de Paris Sud, June 1991. These techniques are designed to combine the signals received by the different sensors constituting the antenna so as to optimize its response to the scenario involving useful signals and jammers.

Since the conditions of propagation and jamming may change in the course of time, it is necessary to be able to adapt the antenna in real time to these variations by the use of a special antenna filtering technique known as the "adaptive antenna" technique. An adaptive antenna is an antenna that detects interference sources automatically by constructing holes in its radiation pattern in the direction of these interferences while at the same time improving the reception from the useful source, without any prior knowledge about the interferences and using minimum information on the useful signal Furthermore, through the tracking capacity of the algorithms used, an adaptive antenna is capable of automatic response to a changing environment.

Until very recently, it was always envisaged, in transmission systems, to have operation independent of the single sensor and adaptive antenna based techniques of adaptive equalization. This leads to sub-optimal performance characteristics. Thus, the system described by R. Dobson in "Adaptive Antenna Array", patent No. PCT/AU85/00157, February 1986, which discriminates between useful signals and jammers by time, manages to reject interferences efficiently but does not seek to optimize the useful signal/noise ratio.

In a context of transmission, and when learning sequences are introduced into the waveform, it is preferable to use techniques of antenna processing with discrimination by modulation as they optimize the useful signal/noise ratio thus preventing the implementation of a goniometric step. However, most of the techniques employed today use complex weights on each of the sensors of the adaptive antenna. An antenna of this kind enables the rejection of the interferences, but in the presence of multiple paths of propagation:

it "aims" in the direction of one of the paths, i.e. it rephases the contributions of this path with the different sensors (for omnidirectional sensors, therefore, a gain in signal-to-noise ratio of 10 log N is obtained, where N is the number of sensors used), and seeks to reject the paths decorrelated from this one, thus losing the energy associated with these paths.

In order to improve the performance characteristics of the last-named antenna processing technique, the idea is to couple it to a monosensor equalization technique. Multiple-antenna equalizers are thus obtained comprising a spatial part consisting of different filters positioned on each of the reception antennas and a temporal part positioned at output of the spatial part.

Receivers that carry out the joint processing of signals coming from several antennas have already been proposed to combat the selecting "fading" generated by the multiple paths in an unjammed environment. These are spatial diversity equalizers. As in monosensor equalization, the most commonly used solutions comprise either a Viterbi algorithm or a DFE structure minimizing the root mean square error (RMS error) between an obtained output and a desired output.

Spatial diversity equalizers based on a Viterbi algorithm are proposed especially in:

an article by P. Balaban and J. Salz entitled "Optimum Diversity Combining and Equalization in Digital Data Transmission with Applications to Cellular Mobile Radio—Part I: Theoretical Considerations", IEEE Trans. on Com., Vol. 40, No. 5, pp. 885–894, May 1992, a patent by G. P. Labedz et al. (Motorola Inc., Schaumburg, Ill., USA) entitled "Method and Apparatus for Diversity Reception of Time-Dispersed Signals", patent No. EP 430481.A2, 12.12.1991, a patent by Okanoue and Kazuhiro (NEC Corp., Tokyo, Japan) entitled "Noise-Immune Space Diversity Receiver", patent No. EP 449327.A2, Mar. 29, 1991, and an article by P. Jung, M. Naβhan and Y. Ma entitled "Comparison of Optimum Detectors for Coherent Receiver Antenna Diversity in GSM Type Mobile Radio Systems", Proc. of the 4th International Symposium on Personal, Indoor and Mobile Radio Communications, PIRMC'93, Yokohama, Japan, 1993.

Their implementation requires prior knowledge of the pulse response of the transmission channel. When there is no jamming, the pulse response of the channel is estimated on the basis of the known symbols and the symbols decided as and when needed by the equalizer.

DFE structure spatial diversity equalizers are proposed in the article by P. Balaban and J. Salz and in an article by K. E. Scott and S. T. Nichols entitled "Antenna Diversity with Multichannel Adaptive Equalization in Digital Radio", Proc. of International Conf. on Com., ICC'91, New York, N.Y., USA, June 1991.

The last-named equalizer is made with self-adaptive filters whose coefficients are adapted by a least error squares algorithm. For the equalizer presented by P. Balaban and J. Salz, the coefficients are computed on the basis of an estimation of the transmission channel. The problem of the jammed environment is no longer dealt with in the study of these equalizers.

The spatial diversity equalizers referred to have been designed to combat the selective "fading" engendered by the multiple paths of the transmission channel, but not at all to reject interferences. However, of these equalizers, only the self-adaptive spatial diversity equalizer proposed by K. Scott and S. Nichols has the capacity to fulfil this last-named function. There is then obtained the transversal and recursive antenna which was the object of a doctoral thesis by L. Féty entitled "Méthodes de traitement d'antenne adaptées aux radiocommunications" (Antenna Processing Methods Adapted to Radiocommunications), at the ENST, June 1988.

However, this processing can be applied only to transmission channels for which the time dispersal of the multiple paths in relation to the symbol duration is reduced, which is generally not the case in HF transmissions at high bit rates and in the GSM system. Indeed, in this context, the number of coefficients to be adapted is far too great for the adaptation algorithm to be capable of converging on a known learning sequence. The other spatial diversity equalizers presented depend on the estimation of the transmission channel which can hardly be obtained in the presence of interference. Furthermore, these equalizers do not integrate the interference rejection function.

In order to overcome the above-mentioned drawbacks, the present Applicant has filed a French patent published under No. 2 716 761 entitled "Procédé permettant une égalisation multivoie dans un récepteur radioélectrique, en présence d'interférences et de multitrajets de propagation" (Method enabling a multiple antenna equalization in a radioelectrical receiver in the presence of interferences and multiple paths of propagation). This method provides jointly for a multiple-sensor equalization processing of the useful signal and a jammer rejection processing. It has the advantage of being an optimal method in the presence of temporally white noise (background noise+jammers), whatever the nature of the useful propagation channel. However, it leads to computation power that may have to be reduced in certain applications.

To this end, a French patent application entitled "Procédé d'égalisation multicapteur permettant une réception multicapteur en présence d'interférences et de multitrajets de propagation, et récepteur pour sa mise en oeuvre" (Multiple-sensor equalization method enabling multiple-sensor reception in the presence of interferences and multiple paths of propagation, and receiver for its implementation) under number 95 14914, was filed on Dec. 15, 1995 by the present Applicant. It relates to a multiple sensor equalizer possessing computation power that is lower than the computation power of the multiple sensor receiver described in the above-mentioned patent application but can lead to lower efficiency performance when the useful propagation channel comprises several paths, owing to the fact that the multiple-sensor receiver is not the optimum in the presence of temporally white noise.

SUMMARY OF THE INVENTION

The invention is aimed at improving the performance characteristics of the prior receiver (patent 95 14914) by making improvements in the receiver according to the patent 2 716 761 while at the same time reducing the computation power of this receiver.

To this end, an object of the invention is a method enabling a multiple sensor equalization in a radioelectrical receiver comprising a specified number of reception antennas, said method comprising the steps of:

estimating the transmission channel on each of the antennas, estimating the background noise component plus interference on each of the antennas on the basis of the estimation of the transmission channel, estimating the spatial correlation matrix, referenced $\hat{R}_b$, of the background noise component plus interferences from the received signal, computing a spatial-temporal filter formed for each discrete temporal element of the estimated multiple-sensor channel of a spatial filter, achieving a temporal filtering of the data elements on the different sensors by the spatial-temporal filter, and equalizing the signal at output of the spatial-temporal filter by one-dimensional equalization at a symbol rate deciding the symbols transmitted.

An object of the invention is also a receiver implementing the above-mentioned method.

The method according to the invention has the advantage of enabling an implementation of a novel multiple-sensor equalizer with lower computation power than the above-mentioned equalizers while at the same time being optimal when the noise is temporally white and enabling an efficient rejection of the jammers.

BRIEF DESCRIPTION OF THE DRAWINGS

Other features and advantages of the invention shall appear from the following description, made with reference to the appended drawings of which.

DESCRIPTION OF THE INVENTION

The method according to the invention is based on a channel estimation performed on each of the input antennas of a multiple channel receiver that enables the computation of the coefficients of a spatial-temporal filter acting on the input data. The output of this filter is processed by a one-dimensional equalizer at the symbol rate which decides on the symbols transmitted. This equalizer may in particular be an equalizer based on the Viterbi algorithm or a DFE type equalizer.

The method jointly fulfils the following functions, namely a jammer rejection function, a function of optimization of the gain in the direction of the different useful paths, with a resetting of these paths in phase and a function of reduction of the distortions caused by the multiple paths associated with the useful signal.

The first two functions are fulfilled by the spatial-temporal filter, and the third function is fulfilled by the equalizer placed at output of this filter.

Figure 1:
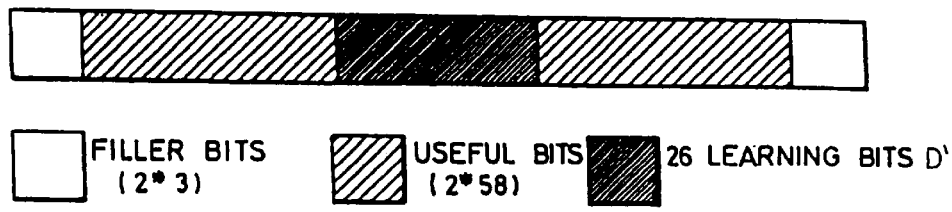
FIG. 1 shows the format of a GSM burst.

For example, the modulation used may be a GMSK type continuous phase modulation with an index ½ and a coefficient BT=0.3 with a symbol period equal to $^{48}\!/_{13}$ μs. The symbols transmitted may be constituted, as shown in FIG. 1, by bursts of 148 symbols, sub-divided into two sequences of 3 filler bits at each end, a learning sequence consisting of 26 known bits placed in the middle of the frame and two sequences of 58 information bits.

The data elements $d_n$ representing the sequence ($d_n$) of the bits to be transmitted are encoded differentially before being modulated. The information transmitted consists of a sequence ($a_n$) computed from the sequence ($d_n$) by the following formulae.

$$a_n=1 \text{ if } d_n=d_{n-1} \text{ and } a_n=-1 \text{ if } d_n \neq d_{n-1} \qquad (1)$$

The GMSK modulation used is of the type described in the article by P. A. Laurent, "Exact and approximate construction of digital phase modulation by superposition by amplitude modulated pulses (AMP)", in IEEE Trans. Comm., Vol. 34 (1986), pp. 150–160.

This modulation is expressed approximately in the form of a linear modulation defined by the relationship:

$$z(t) = \sum_n j^n b_n C_0(t) \quad \text{with:} \quad b_n = \prod_{k \leq n} a_k. \qquad (2)$$

where $C_0(t)$ is the primary main function of the GMSK modulation.

In this case, the modulated signal z(t) can also be put in the form of a convolution product such that:

$$z(t) = \left(\sum_n s_n \delta(t)\right) * C_0(t) = s(t) * C_0(t) \quad \text{with} \qquad (3)$$

$$s(t) = \sum_n s_n \delta(t)$$

taking $s_n = j^n b_n$

The sequence ($s_n$) constitutes the sequence of the symbols transmitted. The demodulation consists in determining the sequence ($s_n$) and then making a trace-back to the sequence of bits transmitted ($d_n$).

The transmitted signal z(t) reaches a reception array comprising K sensors after it has passed into the mobile radio propagation channel.

The multiple-sensor signal received is expressed as follows on the basis of the signal s(t):

$$X(t)=[x_1(t), \ldots, x_K(t)]^T=s(t)*G(t)+B(t),$$

where:

G(t) is the multiple-sensor channel received, constituted by the total waveform of emission $C_0(t)$, the emission filter, the propagation channel and the reception filter, $x_i(t)$ is the signal received by the sensor i.

X(t) may also be written as a function of the symbols transmitted:

$$X(t) = \sum_n s_n G(t - nTs) + B(t). \qquad (4)$$

where Ts is the symbol period.

Figure 2:
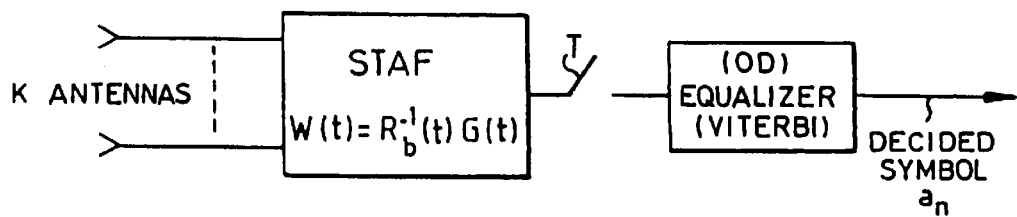
FIG. 2 is a simplified drawing of an optimum multiple-sensor receiver.

The article by P. Vila, F. Pipon, D. Pirez and L. Fety, "MLSE Antenna Diversity Equalization of a Jammed Frequency-Selective Fading Channel", Proc. EUSIPCO'94, pp. 1516–1519, Edinburgh, UK, September 1994 has presented the optimum multiple-sensor receiver as understood in terms of minimization of probability of decision error on the transmitted sequence. This optimum receiver, as shown in FIG. 2, implements a spatial-temporal adapted filter hereinafter designated by the abbreviation "STAF", whose expression is given by the relationship:

$$W(t)=R_b^{-1}(t)*G(t), \qquad (5)$$

where $R_b(t)$ is the correlation function of noise B(t). It also implements a sampler T at the symbol rate and a decision unit OD that determines the sequence of symbols transmitted. The decision element is based on the Viterbi algorithm as described in the article by J. G. Proakis, "Adaptive equalization for TDMA digital mobile radio", IEEE Trans. on Vehicular Techn., Vol. 40, No. 2, May 1991. This algorithm makes it possible, on the basis of the sequence ($y_n$) obtained at output of the STAF filter, to find the sequence ($s^{k_0}_n$) with an index $k_0$ that minimizes the probability of decision error in the sequence of symbols transmitted or again, in an equivalent manner, that maximizes the following criterion:

$$\begin{cases} k0 = \text{argMAX}_k \left\{ j^k(X) = \sum_n j_n^k(X) \right\} \\ \text{with:} \quad j_n^k(X) = 2\,\text{Re}\left[ s_n^{k*}\left( y_n - \sum_{p<n} s_p^k \gamma_{n-p} \right) \right] - |s_n^k|^2 \gamma_0 \\ \text{where:} \quad -\gamma_n = G^+(-t) * W(t)_{t=nTs} \\ \quad -y_n = W^+(-t) * X(t)_{t=nTs} \end{cases} \quad (6)$$

The Viterbi algorithm works on the basis of the output signal from the STAF filter $y_n$ and the coefficients $\gamma_n$.

The implementation of the above processing operation in multiple-sensor receivers makes it possible to obtain optimum reception as understood by the minimization of the probability of decision error in the sequence of symbols transmitted in the presence of background noise and jammers.

The multiple-sensor receiver of the invention constitutes an implementation of the optimal multiple-sensor receiver presented here above in the special case where the noise is temporally white ($R_b(t)=R_b$). It is therefore the optimum when the jammer is temporally white (which is approximately the case in the GSM system where the modulation of the jammers is the GMSK modulation) and when it comprises a single propagation path, regardless of the nature of the useful channel.

According to the invention, the matrix $R_b$ is estimated by means of a channel estimation algorithm performed on each of the input antennas. The different processing steps to be implemented are shown in the flow chart of FIG. 3.

Figure 3:
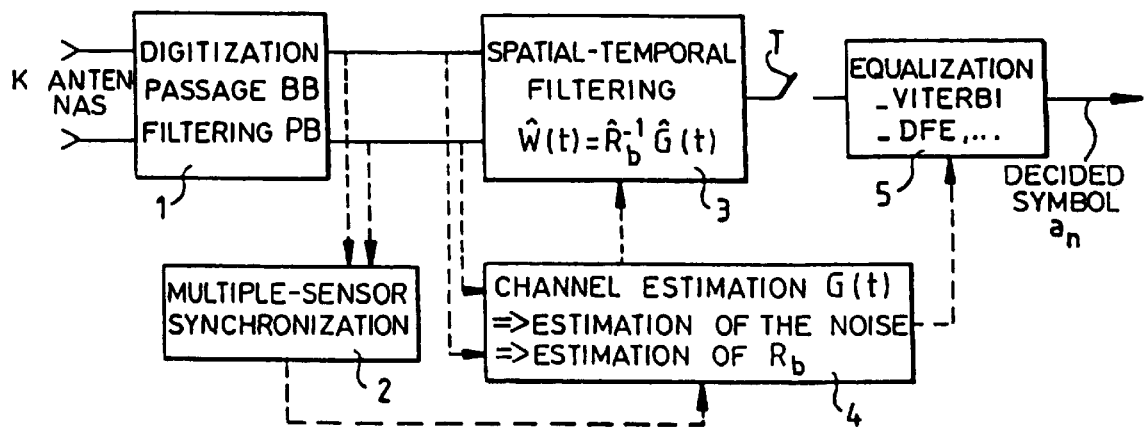
FIG. 3 shows the different steps of the method according to the invention.

The first step, which is represented by the reference 1 in FIG. 3, consists of the performance of an operation to digitize the signals applied to the sensors, transpose them in baseband and then filter them by a reception filter. A complex signal sampled at a frequency Fe which is a multiple of the symbol frequency Fs (Fe=2 Fs for the exemplary embodiment) is obtained at the end of the step 1.

The step 2 performs the synchronization of the receiver with the symbols received. This step can be performed as described in the patent application filed by the present Applicant on Jan. 21, 1994 entitled "Synchronisation en présence de brouilleurs et de multitrajets" (Synchronization in the presence of jammers and multiple paths), corresponding to U.S. Pat. No. 5,812,090.

It enables the receiver to be positioned in such a way that the received signal X(n Te) is expressed as a function of the signal transmitted s(n Te), s[(n−1) Te], . . . , s[(n−L+1) Te], where L represents the length (in number of samples) of the useful propagation channel taken into account during the demodulation following the relationship:

$$X(n\ Te) = \sum_{p=0}^{L-1} s[(n-p)Te]\, G(p\ Te + B(n\ Te) \quad (7)$$

For example, by choosing L=12 (with $F_2=2F_s$), the number of states taken into account in the Viterbi algorithm is equal to $2^{(L/2)-1}=32$.

Under these conditions, the samples of the signal s(n Te) are expressed on the basis of the symbols transmitted by the relationship:

s[(2n)Te]=$s_n$ et s[(2n+1)Te]=0.

The step 3 is aimed at performing n spatial-temporal filtering operations when the noise is temporally white. It requires the estimation of the useful channel G(t) and of the correlation matrix of the noise $R_b$. This estimation is achieved at the step 4 by performing the following estimations:

A first estimation consists in estimating the transmission channel on each of the input antennas:

By using the expression $G_k$ to designate the vector constituted by means of the temporal samples of the propagation channel on the antenna k:

$$G_k = (g_k(0), \ldots, g_k[(L-1)Te])^T \quad (8)$$

where $g_k(t)$ represents the channel obtained on the antenna k and taking:

$$S(nTe) = \{s(nTe), \ldots, s[(n-L+1)Te]\}^T$$

to denote the vector formed by means of the known symbols of the learning sequence, the signal received by the antenna k is written as follows:

$$x_k(nTe) = G_k^H S(nTe) + b_k(nTe) \quad (9)$$

and the estimation of the channel on the antenna k is obtained by the known Wiener formula:

$$\hat{G}_k = \hat{R}_{SS}^{-1} \hat{r}_{sx} \quad (10)$$

In the context of the GSM application given as an example, the correlation matrix $R_{SS}$ and the intercorrelation $r_{sx}$ may be estimated on the 16 bits placed at the center of the learning sequence (namely on N=32 samples) by the non-biased standard estimator:

$$\hat{R}_{SS} = \frac{1}{N} \sum_{n=0}^{N} S(nTe) S(nTe)^H \quad (11)$$

$$\hat{r}_{Sx} = \frac{1}{N} \sum_{n=0}^{N} S(nTe) x_k(nTe)^*$$

where the operator "$^H$" represents the operation of transposition-conjugation.

The learning sequences of the GSM system are chosen so as to obtain a cancellation of the self-correlation function on five symbols on either side of the instant t=0. In this case, the matrix $\hat{R}_{SS}$ is equal to the identity matrix and therefore the channel estimation is obtained directly from the knowledge of the intercorrelation vector $\hat{r}S_x$, whence we get $\hat{G}_k = \hat{r}_{Sx}$.

A second estimation consists in estimating noise samples on each of the input antennas.

On the basis of the estimation of the propagation channel, it is indeed possible to obtain an estimation of the noise samples on each of the input antennas by the formula:

$$\hat{b}_k(nTe) = x_k(nTe) - \hat{G}_k^H S(nTe) \quad (12)$$

This makes it possible to obtain an estimate of the noise vector $\hat{B}(nTe) = [\hat{b}_1(nTe), \ldots, \hat{b}_K(nTe)]^T$ for the N samples used by the channel estimation.

A third estimation consists in estimating the correlation matrix of the noise $\hat{R}_b$:

The correlation matrix of the noise is obtained from the noise samples $\hat{B}(nTe)$ estimated by the non-biased standard estimator. It is obtained by the relationship:

$$\hat{R}_b = \frac{1}{N} \sum_{n=0}^{N} \hat{B}(nTe)\hat{B}(nTe)^H \quad (13)$$

The computation of the coefficients of the spatial-temporal filters obtained at the step 3 by the relationship:

$$[\hat{W}(0), \hat{W}(Te), \ldots, \hat{W}(L-1)Te] = \hat{R}_b^{-1}[\hat{G}(0), \hat{G}(Te), \ldots, \hat{G}(L-1)Te] \quad (14)$$

The coefficients of the filter are obtained either by resolving all the linear systems contained in the equation (14) or by reversing the matrix $R_b$ by any appropriate method for the inversion of hermitian matrices and especially the Gauss pivot method.

If the length of the channel is smaller than the number of sensors ($L \leq K$), it may be advantageous, in order to reduce the computation power, to refrain from computing $\hat{R}_b^{-1}$, but to directly resolve the six linear systems (for example by the method of the Gauss pivot):

$$\hat{R}_b \hat{W}(iTe) = \hat{G}(iTe).$$

The step 5 consists in computing the coefficients used by the Viterbi equalizer:

The coefficients $\gamma_n$ used by the Viterbi algorithm are obtained by the formula (6). These coefficients are expressed also as a function of the vectors $\hat{G}(iTe)$ and $\hat{W}(iTe)$ according to the relationship:

$$\gamma_n = \sum_{i=0}^{L-1-2n} \hat{G}^H(iTe)\hat{W}((2n+i)Te) \quad (15)$$

These coefficients represent the inter-symbol interference model at output of the spatial-temporal filter which has to be processed by the one-dimensional equalizer.

(The factor 2n is due to the fact that the coefficients used by the Viterbi algorithm are computed at the symbol rhythm.)

The spatial-temporal filtering of the input signals is obtained at the symbol rhythm from the estimated filters during the previous step:

$$y(n) = \sum_{i=0}^{L-1} \hat{W}(iTe)^H \hat{X}(nTs + iTe) \quad (16)$$

Figure 4:
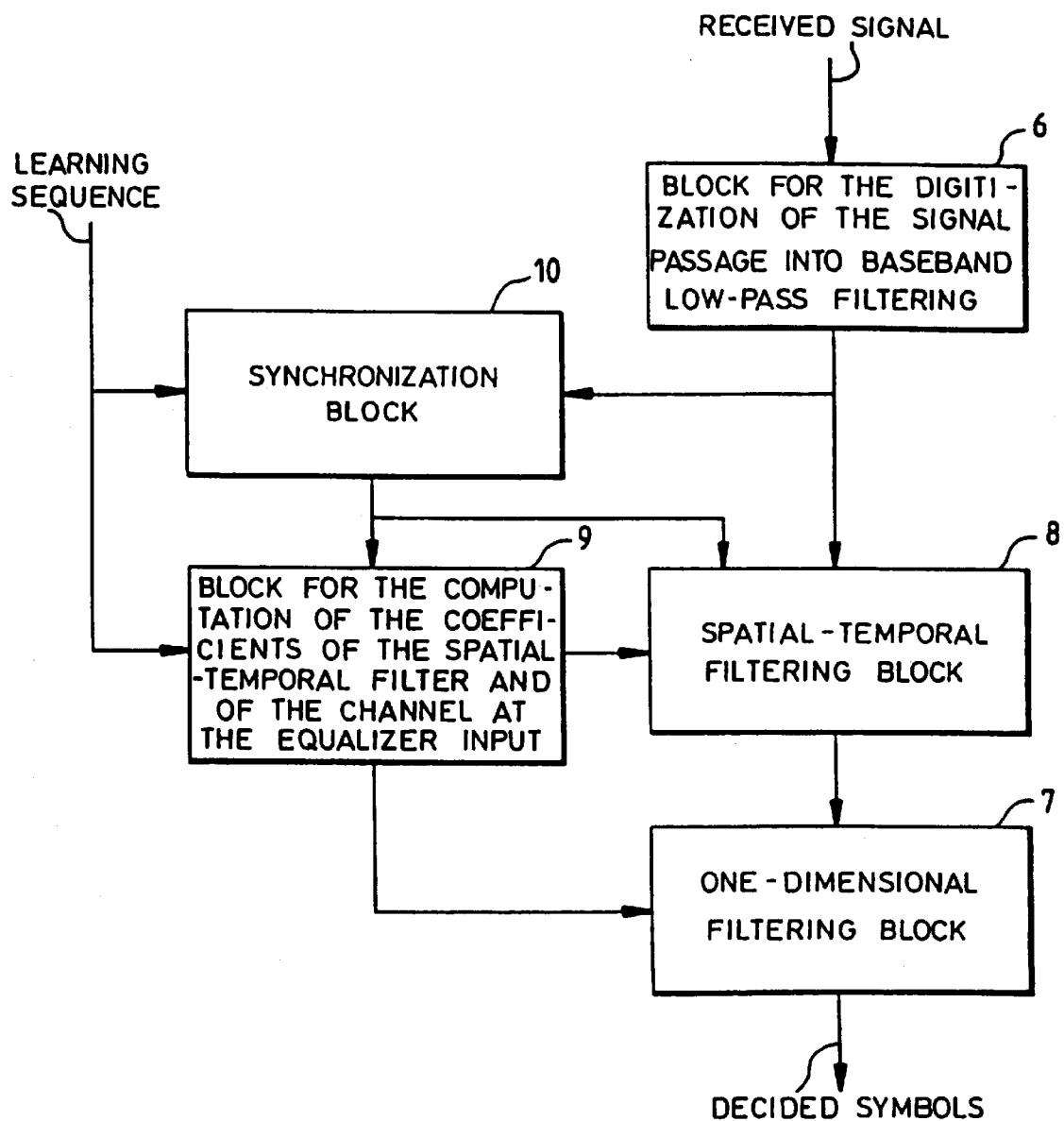
FIG. 4 shows an exemplary embodiment of a receiver for the implementation of the method according to the invention.

One embodiment of a receiver for the implementation of the method according to the invention is shown in FIG. 4. This embodiment has a first block 6 for the digitization of the signal applied to each of the K reception antennas. A second one-dimensional equalization block is coupled to the first block 6 by means of a third spatial-temporal filtering block 8. A fourth block 9 computes the coefficients of the spatial-temporal filter block 8 as well as those characterizing the useful channel at the input of the one-dimensional equalization block 7. Finally, a fifth block 10 synchronizes signals between the different blocks.

In a first embodiment of a receiver according to the invention, the equalization block may be programmed to retrieve the symbols transmitted by minimizing the probability of decision error according to the Viterbi algorithm. In this case, the coefficients $\gamma_n$ to be taken into account to perform the Viterbi algorithm are those defined by the relationship (15).

This embodiment however is not unique and other types of algorithms such as the above-mentioned "M algorithm" which is a simplified version of the Viterbi algorithm or again a DFE type equalization may also be implemented to obtain the equalization block 7. However, the results obtained by these embodiments then appear to be slightly deteriorated when compared with those that can be given by an equalization implementing the Viterbi algorithm. They may however be used in applications where the available computation power is insufficient for the performance of the Viterbi algorithm.

What is claimed is:

1. A method enabling a multiple sensor equalization in a radioelectrical receiver comprising a specified number of reception antennas, said method comprising the steps of:

estimating the transmission channel on each of the antennas, estimating the background noise component plus interference on each of the antennas on the basis of the estimation of the transmission channel, estimating the spatial correlation matrix referenced $\hat{R}_b$ of the background noise component plus interferences from the received signal, computing a spatial-temporal filter formed for each discrete temporal element of the estimated multiple-sensor channel of a spatial filter, achieving a temporal filtering of the data elements on the different sensors by the spatial-temporal filter, and equalizing the signal at output of the spatial-temporal filter by one-dimensional equalization at a symbol rate deciding the symbols transmitted.

2. A method according to claim 1, wherein the spatial-temporal filter is formed, for each discrete temporal element of the n channel of the estimated multiple-sensor channel, by a spatial filter $\hat{W}(n)$ obtained by the formula: $\hat{W}(n) = \hat{R}_b^{-1} \hat{G}(n)$ where $\hat{G}(n)$ represents the result of the filtering performed by the spatial-temporal filter.

3. A method according to claim 1, wherein the equalization takes place by the performance of a Viterbi algorithm.

4. A method according to claim 1, wherein the equalization takes place by the use of a DFE type equalizer.

5. A method according to any of the claims 1 to 4 consisting of the performance of a digitization operation followed by a transposition operation and a filtering operation.

6. A receiver comprising a first block for the digitization of the signals applied to each of the channels, a second one-dimensional equalization block coupled to the first block by means of a third spatial-temporal filtering block, a fourth block for the computation of the coefficients of the spatial-temporal filter and the computation of the characteristic coefficients of the transmission channel to be applied to the second equalization block.

* * * * *